US012346806B1

(12) United States Patent
Liang et al.

(10) Patent No.: US 12,346,806 B1
(45) Date of Patent: Jul. 1, 2025

(54) ARTIFICIAL INTELLIGENCE INTERIOR DESIGN SYSTEM

(71) Applicant: Amazon Technologies, Inc., Seattle, WA (US)

(72) Inventors: Anqi Liang, Seattle, WA (US); Rui Chen, Bellevue, WA (US); Maksim Lapin, Berlin (DE); Aleix Margarit Martinez, Seattle, WA (US); Gerard Gjonej, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 530 days.

(21) Appl. No.: 17/363,297

(22) Filed: Jun. 30, 2021

(51) Int. Cl.
| | |
|---|---|
| *G06F 3/0482* | (2013.01) |
| *G06N 3/08* | (2023.01) |
| *G06T 7/73* | (2017.01) |
| *G06T 11/60* | (2006.01) |
| G06F 18/21 | (2023.01) |
| G06F 18/214 | (2023.01) |
| G06F 18/22 | (2023.01) |
| G06F 18/2413 | (2023.01) |
| G06V 20/52 | (2022.01) |

(52) U.S. Cl.
CPC ............ *G06N 3/08* (2013.01); *G06F 3/0482* (2013.01); *G06T 7/75* (2017.01); *G06T 11/60* (2013.01); *G06F 18/2148* (2023.01); *G06F 18/2178* (2023.01); *G06F 18/22* (2023.01); *G06F 18/24147* (2023.01); *G06T 2200/24* (2013.01); *G06T 2207/20084* (2013.01); *G06T 2210/04* (2013.01); *G06V 20/52* (2022.01)

(58) Field of Classification Search
CPC .. G06N 3/08; G06T 7/75; G06T 11/60; G06T 2207/20084; G06T 2210/04; G06F 3/0482; G06F 18/2178; G06F 18/22; G06F 18/24147; G06F 18/2148; G06V 20/52
See application file for complete search history.

(56) References Cited

U.S. PATENT DOCUMENTS

| | | | |
|---|---|---|---|
| 11,106,842 B2 * | 8/2021 | Segev | G06N 5/025 |
| 11,521,391 B2 * | 12/2022 | Kim | G06F 18/22 |
| 2019/0384990 A1 * | 12/2019 | Kim | H04L 67/10 |
| 2021/0073449 A1 * | 3/2021 | Segev | G06F 30/27 |
| 2021/0173967 A1 * | 6/2021 | Yang | G06T 19/20 |
| 2021/0256180 A1 * | 8/2021 | Austern | G06F 30/12 |
| 2022/0269888 A1 * | 8/2022 | Stoeva | G06T 19/006 |
| 2023/0419662 A1 * | 12/2023 | Stoeva | G06T 7/55 |

* cited by examiner

*Primary Examiner* — Anil K Bhargava
(74) *Attorney, Agent, or Firm* — K&L Gates LLP

(57) ABSTRACT

Techniques are generally described for an artificial intelligence based interior designer system. In various examples, an image comprising a plurality of items arranged together in a room may be received. A visual representation and a positional representation of each item represented in the image may be determined. An output embedding may be generated based at least in part on the visual representation and the positional representation of each item represented in the image. At least one output item may be determined based at least in part on the output embedding. An image of the at least one output item may be displayed in association with the image comprising the plurality of items arranged together in the room.

16 Claims, 8 Drawing Sheets

ARTIFICIAL INTELLIGENCE INTERIOR DESIGN SYSTEM

BACKGROUND

Interior designers provide recommendations as to furniture and decorative items that may be used to furnish a home, office, retail space, etc. In some examples, furniture and/or other decorative items may be purchased from an online retail system. Online retail systems allow customers to search product databases during online shopping. Customers typically search for products using search terms related to the product. Online retail systems sometimes allow users to filter search results so that only those search results matching user-defined criteria are displayed. Photographs of products are typically shown from a variety of different views so that customers can view the product from different angles. Product detail pages often provide additional detail regarding the products such as user reviews, product specifications, pricing, product colors, delivery time, etc.

DETAILED DESCRIPTION

Figure 1:
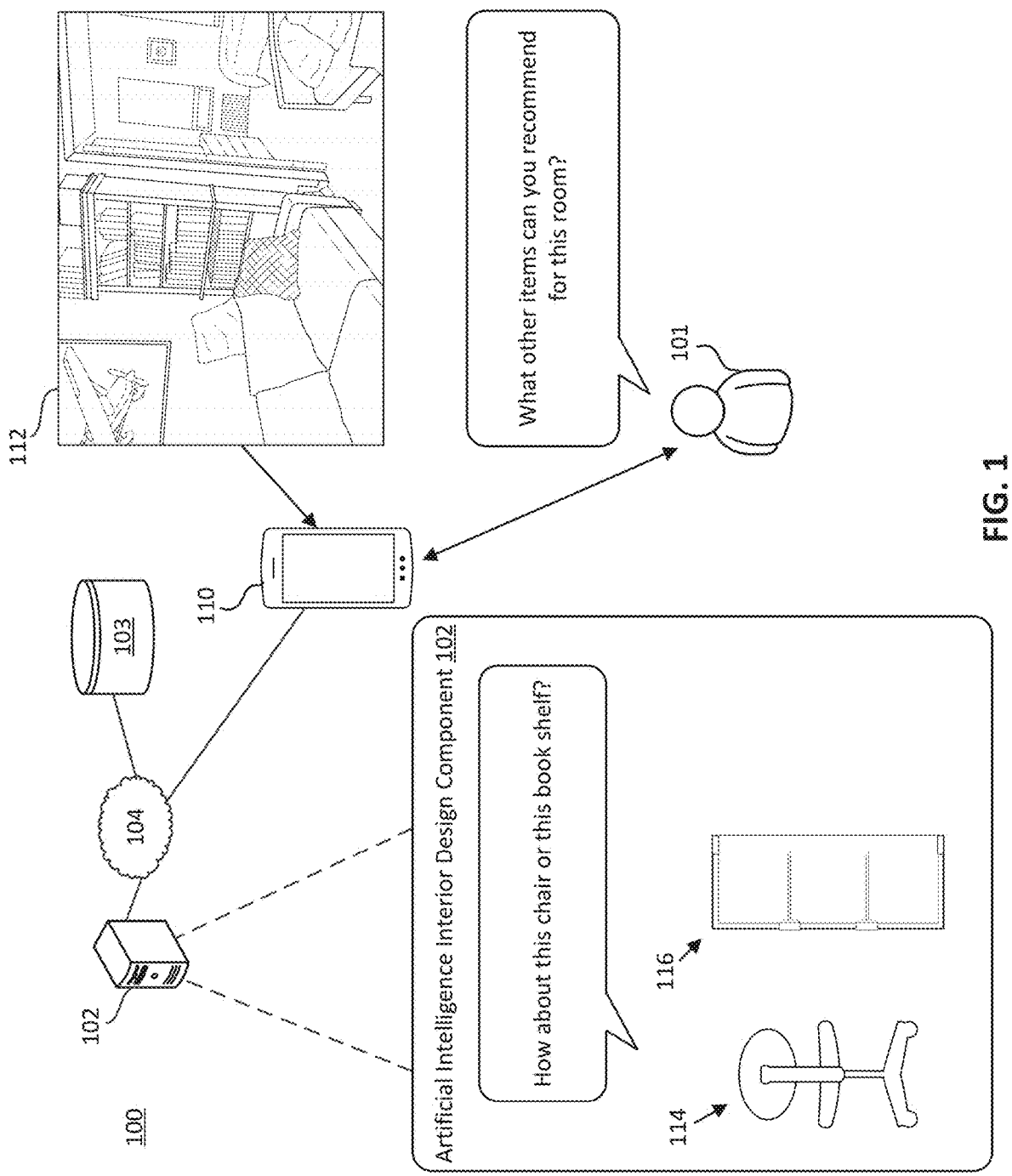
FIG. 1 is a diagram depicting an example artificial intelligence interior design system effective to recommend visually complementary items based on an image, in accordance with various aspects of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Machine learning techniques, such as those described herein, are often used to form predictions, solve problems, recognize objects in image data for classification, etc. For example, machine learning techniques may be used to detect objects represented in image data and/or translate text from one spoken language to another. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLU) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

Transformer models (e.g., transformer machine learning models) are machine learning models that include an encoder network and a decoder network. The encoder takes an input and generates feature representations (e.g., feature vectors, feature maps, etc.) of the input. The feature representation is then fed into a decoder that may generate an output based on the encodings. In natural language processing, transformer models take sequences of words as input. For example, a transformer may receive a sentence and/or a paragraph comprising a sequence of words as an input. In various examples described herein, a transformer may instead receive a set of images of objects as input. In various examples, the images may represent items that are arranged together in an environment. For example, a room with one or more furniture items and/or other characteristics (e.g., floor type, wall paint color, wallpaper patterns, with different artwork, etc.) may be decomposed into individual images of each item and/or a subset of the items in the room. In some examples, the set or subset of items in the room may be detected using an object detector. A backbone network (e.g., a convolutional neural network) may be used to generate feature embeddings representing the individual item images and the scene images including all of the items arranged together. These embeddings may be input into a transformer encoder along with positional embeddings describing a spatial position of each of the items within the room (e.g., within the frame of image data). As described in further detail below, the transformer may generate output embeddings comprising visual representations of items that are visually complementary to the room and the input items.

In general, the encoder network of a transformer comprises a set of encoding layers that processes the input data one layer after another. Each encoder layer generates encodings (referred to herein as "tokens"). These tokens include feature representations (e.g., feature vectors and/or maps)

that include information about which parts of the input data are relevant to each other. For example, for each input embedding the encoder layers may determine which parts of the token are relevant to other tokens received as part of the input data. Each encoder layer passes its token output to the next encoder layer. The decoder network of the transformer takes the tokens output by the encoder network and processes them using the encoded contextual information and the encoder-decoder attention mechanism to generate output embeddings. Each encoder and decoder layer of a transformer uses an attention mechanism, which for each input, weighs the relevance of every other input and draws information from the other inputs to generate the output. Each decoder layer also has an additional attention mechanism which draws information from the outputs of previous decoders, prior to the decoder layer determining information from the encodings. Both the encoder and decoder layers have a feed-forward neural network for additional processing of the outputs, and contain residual connections and layer normalization steps.

Scaled Dot-Product Attention

The basic building blocks of the transformer are scaled dot-product attention units. When input data is passed into a transformer model, attention weights are calculated between every token simultaneously. The attention unit produces embeddings for every token in context that contain information not only about the token itself, but also a weighted combination of other relevant tokens weighted by the attention weights.

Concretely, for each attention unit the transformer model learns three weight matrices; the query weights $W_Q$, the key weights $W_K$, and the value weights $W_V$. For each token, the input embedding $x_i$ is multiplied with each of the three weight matrices to produce a query vector $q_i = x_i W_Q$, a key vector $k_i = x_i W_K$, and a value vector $v_i = x_i W_V$. Attention weights are calculated using the query and key vectors: the attention weight $a_{ij}$ from token is the dot product between $q_i$ and $k_j$. The attention weights are divided by the square root of the dimension of the key vectors, $\sqrt{d_k}$, which stabilizes gradients during training. The attention weights are then passed through a softmax layer that normalizes the weights to sum to. The fact that $W_Q$ and $W_K$ are different matrices allows attention to be non-symmetric: if token i attends to token j, this does not necessarily mean that token j will attend to token i. The output of the attention unit for token i is the weighted sum of the value vectors of all tokens, weighted by $a_{ij}$, the attention from i to each token.

The attention calculation for all tokens can be expressed as one large matrix calculation, which is useful for training due to computational matrix operation optimizations which make matrix operations fast to compute. The matrices Q, K, and I are defined as the matrices where the ith rows are vectors $q_i$, $k_i$, and $v_i$ respectively.

$$\text{Attention}(Q, K, V) = \text{softmax}\left(\frac{QK^T}{\sqrt{d_k}}\right) V$$

Multi-Head Attention

One set of $(W_Q, W_K, W_V)$ matrices is referred to herein as an attention head, and each layer in a transformer model has multiple attention heads. While one attention head attends to the tokens that are relevant to each token, with multiple attention heads the model can learn to do this for different definitions of "relevance." The relevance encoded by transformers can be interpretable by humans. For example, in the natural language context, there are attention heads that, for every token, attend mostly to the next word, or attention heads that mainly attend from verbs to their direct objects. Since transformer models have multiple attention heads, they have the possibility of capturing many levels and types of relevance relations, from surface-level to semantic. The multiple outputs for the multi-head attention layer are concatenated to pass into the feed-forward neural network layers.

Each encoder comprises two major components: a self-attention mechanism and a feed-forward neural network. The self-attention mechanism takes in a set of input encodings from the previous encoder and weighs their relevance to each other to generate a set of output encodings. The feed-forward neural network then further processes each output encoding individually. These output encodings are finally passed to the next encoder as its input, as well as the decoders.

The first encoder takes position information and embeddings of the input data as its input, rather than encodings. The position information is used by the transformer to make use of the order of the input data or in various examples described herein, the positions of the items in the input scene image. In various examples described herein, the position embedding may describe a spatial relationship of a plurality of tokens relative to other tokens. For example, an input token may represent a 16×16 (or other dimension grid) overlaid on an input frame of image data. The position embedding may describe a location of an item/token within the grid (e.g., relative to other tokens representing other portions of the frame). Accordingly, rather than a one-dimensional position embedding (as in the natural language context wherein the position of a word in a one-dimensional sentence/paragraph/document is defined), the various techniques described herein describe two-dimensional that describe the spatial location of a token within the input data (e.g., a two-dimensional position within a frame, a three-dimensional position within a point cloud, etc.).

Each decoder layer comprises three components: a self-attention mechanism (e.g., scaled dot product attention), an attention mechanism over the encodings (e.g., "encoder-decoder" attention), and a feed-forward neural network. The decoder functions in a similar fashion to the encoder, but an additional attention mechanism is inserted which instead draws relevant information from the encodings generated by the encoders. In a self-attention layer, the keys, values and queries come from the same place—in the case of the encoder, the output of the previous layer in the encoder. Each position in the encoder can attend to all positions in the previous layer of the encoder. In "encoder-decoder attention" layers (sometimes referred to as "cross-attention"), the queries come from the previous decoder layer, and the keys and values come from the output of the encoder. This allows every position in the decoder to attend over all positions in the input sequence. The decoder is attending to the encoder features.

Furnishing a room in an aesthetically pleasing way can be a difficult task. Traditionally, people may go to physical stores to see different furniture sets. They may also get professional advice from shop assistants and/or interior designers. There has been rapid growth in the market of online furniture shopping in recent years. Despite the convenience of online shopping, quickly finding furniture and/or decorative items through online retailers that fit with the customers' personal preference, the existing furniture pieces owned by the customer, and the style of their room settings (e.g., wall color, floor color, etc.) becomes a big challenge.

In order to recommend the right furniture products to customers, online retailers have launched various recommendation systems based on visual compatibility. For example, some recommender systems start from a single product (e.g., a sofa) and recommend additional products (e.g., a coffee table and/or a lamp) to form a compatible furniture set. Some other recommender systems provide professionally photographed indoor scene images (e.g., of rooms/living spaces designed by an interior designers) to customers and retrieve products that are the same as, or which are visually similar to, the furniture/items depicted in the photograph. In addition to the home furniture market, multiple visually complementary recommendation systems have been introduced in the fashion recommendation domain.

Prior work largely focuses on learning the pairwise visual complementarity between pairs of items. Though building a compatible set is the ultimate goal, the systems would usually start from complementary pairs and apply heuristic search algorithms (e.g., beam search) or human-crafted chain rules to connect pairs into sets of complementary items. However, such approaches may not be scalable as the size of the recommendation sets grows, the pair-to-set procedure would become either more expensive (e.g., in terms of processing requirements with additional pairs to be evaluated or by adding more human-crafted rules) or less optimal (e.g., decreasing the beam size). Training models based on pairwise visual complementarity is time-consuming and requires expert-level annotation. For example, professional interior designers are typically used to select a complementary item for a given item from among a large corpus of candidate items. However, as described in further detail below, the various machine learning AI interior design systems and techniques described herein require only bounding box and/or class annotations of training images, which can be performed by off-the-shelf object detection systems and/or by non-expert annotators (depending on the desired implementation). The AI interior design systems and techniques described herein learn to output a set of one or more visually complementary items based on the characteristics of the input image without pairwise annotation.

Additionally, most previous systems require inputs of the category information in order to do the retrieval (e.g., allowing the user to specify the category "sofa" or "armchair"). For example, a customer may want a coffee table and a lamp that are visually complementary to a particular sofa. The image of the sofa may need to be input together with the category labels (sometimes referred to as "class labels") of "coffee table" and "lamp" into the system in order to get a recommendation set that includes the specific sofa, a matching coffee table, and a matching lamp. However, such an approach may not be scalable because, as the number of categories increases, the required inputs of the category information becomes a non-negligible computational burden. Described herein are various systems and techniques that may retrieve images of visually complementary furniture products (and/or other items) to an indoor scene image.

FIG. 1 is a diagram depicting an example system 100 comprising an artificial intelligence (AI) interior design component 102 effective to recommend visually complementary items based on an image, in accordance with various aspects of the present disclosure. In various examples, one or more computing devices may be used to implement the AI interior design component 102 that may be configured in communication over a network 104. Network 104 may be a communication network such as a local area network (LAN), a wide area network (such as the Internet), or some combination thereof. The one or more computing devices implementing AI interior design component 102 may communicate with non-transitory computer-readable memory 103 (e.g., either locally or over network 104). Non-transitory computer-readable memory 103 may store instructions that may be effective to perform one or more of the various techniques described herein. For example, the instructions may be effective to implement one or more of the various machine learning models described herein.

In the example of FIG. 1, user 101 has selected a frame of image data 112 depicting a scene comprising furniture and/or other items arranged within a room or other environment. In various examples, user 101 may have captured the frame of image data 112 using a camera of device 110 (e.g., a mobile device such as a smartphone, tablet, wearable device, laptop computer, digital camera, etc.). In such cases the frame of image data 112 may be uploaded to the AI interior design component 102. In various other examples, user 101 may have selected an image displayed on device 110 (e.g., via a website).

In the example depicted in FIG. 1, the user 101 has requested other items that can be recommended for the room (e.g., recommended content and/or items) depicted in the frame of image data 112. The user may make the request using a speech processing system and/or by inputting text or selecting a control element of a graphical user interface of the AI interior design component 102 that is configured to generate recommendations based on input images.

The request and the frame of image data 112 may be sent to the AI interior design component 102 over network 104. In other examples, the AI interior design component 102 may be executed wholly or partially locally on the device 110. The AI interior design component 102 may determine one or more items that are visually complementary to the items and/or room depicted in the frame of image data 112. The specific techniques that the AI interior design component 102 may use to determine the visually complementary items are described in further detail below. In the example of FIG. 1, the AI interior design component 102 may output audio representing a response and/or may display a response to the user 101's request. For example, a text-to-speech component (TTS) of the AI interior design component 102 may output audio that states "How about this chair or this book shelf?" Additionally, the AI interior design component 102 may display images of the recommended chair 114 and/or bookshelf 116. It should be appreciated that although two items are depicted in FIG. 1, any number of items may be recommended depending on the desired implementation. In various examples, the AI interior design component 102 may suggest items to replace items already present within the room/environment (e.g., frame of image data 112) and/or may suggest additional items for the room/environment.

Starting from a scene image (e.g., an indoor or outdoor living space), or an image of an empty room, the machine learning components of AI interior design component 102 determines the proper product categories to be added to the room and retrieves the visually complementary products that can either replace the existing pieces in the image or be added as supplementary items.

The set recommendation problem may be viewed as a direct set-to-set prediction problem instead of an indirect pair-to-set problem. Transformer models employ self-attention mechanisms to allow for pair-wise interactions between tokens in a sequence/set. In various techniques described herein, the input scene image and the items presented in the image are treated as the input set. The goal is to predict the output set directly by optimizing two major loss functions to learn both the output tokens' class labels and their visual representation embeddings for visually-complementary item retrieval.

In various examples described herein, an AI interior design system is described that recommends a set of visually complementary products based on a single input of a scene image (e.g., of an indoor and/or outdoor living area). The pipeline removes the burden of pair-to-set generation and hand-designed components. The system can be easily scaled to large datasets and generalized to other domains.

In various examples described herein, the transformer architecture may be employed to reformulate the set recommendation problem into a set-to-sequence/set problem. The transformer model may be optimized using two losses-a cross-entropy loss for class label prediction and a triplet loss for metric learning. In addition, regularization terms may be used to enlarge the variety of the recommended set and avoiding collapse of the embedding space. In various examples, the bipartite matching algorithm may be used for set prediction to match the predicted tokens to ground-truth tokens.

Figure 2:
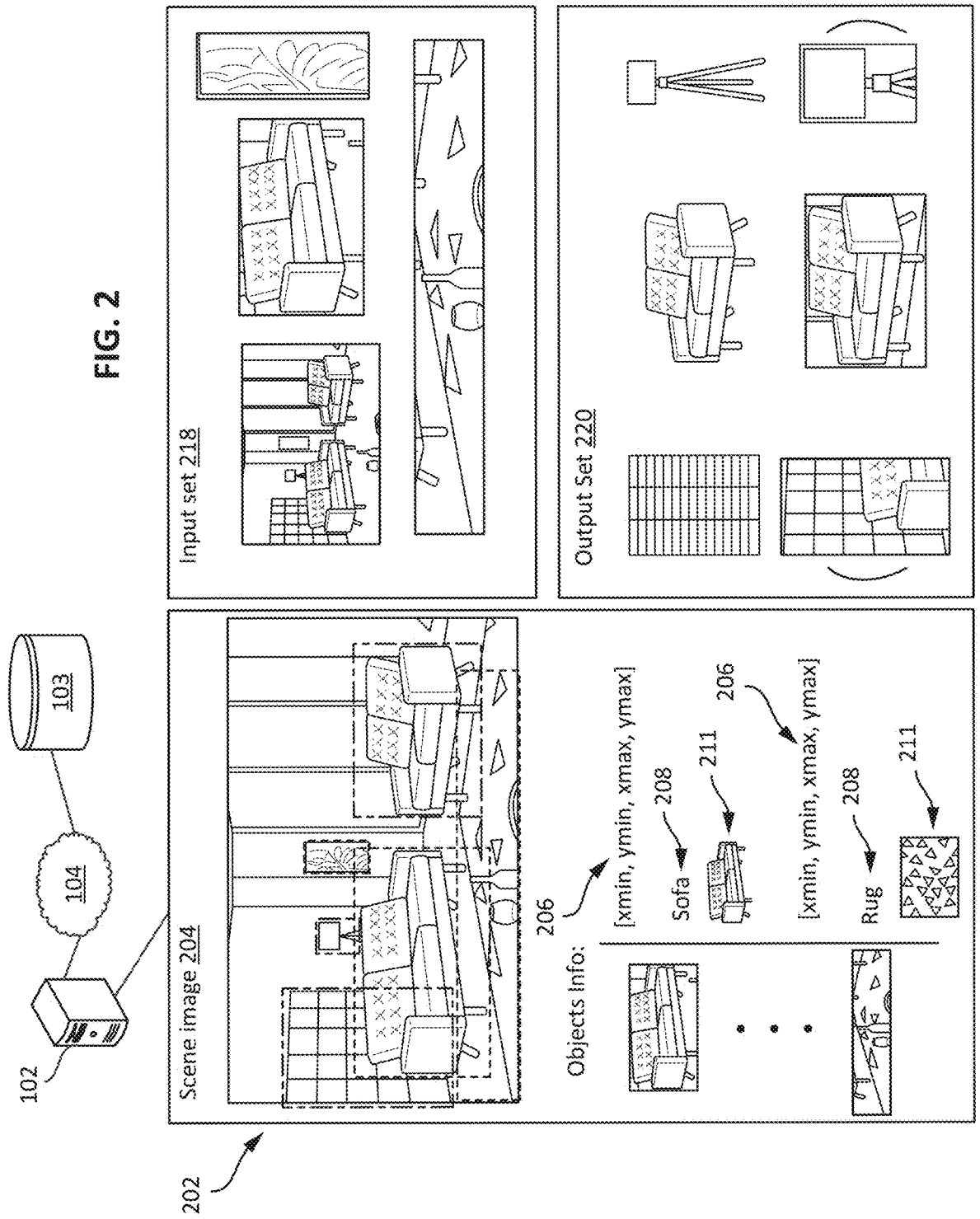
FIG. 2 is a block diagram illustrating a mapping of an input set of images to an output set of images by an artificial intelligence interior design system, in accordance with various aspects of the present disclosure.

FIG. 2 is a block diagram illustrating a mapping of an input set of images to an output set of images by an artificial intelligence interior design system, in accordance with various aspects of the present disclosure. A training data structure is described in reference to FIG. 2.

The training data 202 may include scene images 204 (e.g., images of one or more items arranged in a room or other environment), where each scene image 204 may have at least three furniture items labeled/detected within it. As shown in FIG. 2, each labeled item of a scene image 204 of the has three pieces of information: the bounding box coordinates 206 (xmin, ymin, xmax, ymax) annotated on the original image, a class label 208, and a plain-background image 211 associated to the relevant item from scene image 204. For example, the sofa in scene image 204 is associated with bounding box coordinates 206, class label 208 (e.g., "sofa"), and a plain-background image 211 of the particular couch. During training, the objects in a scene image 204 may be divided (e.g., randomly or pseudo-randomly) into two sets (or sequences)—input set 218 and output set 220. The training goal is to predict the tokens in the output set (or sequence) 220 using the input set 218.

Figure 3A:
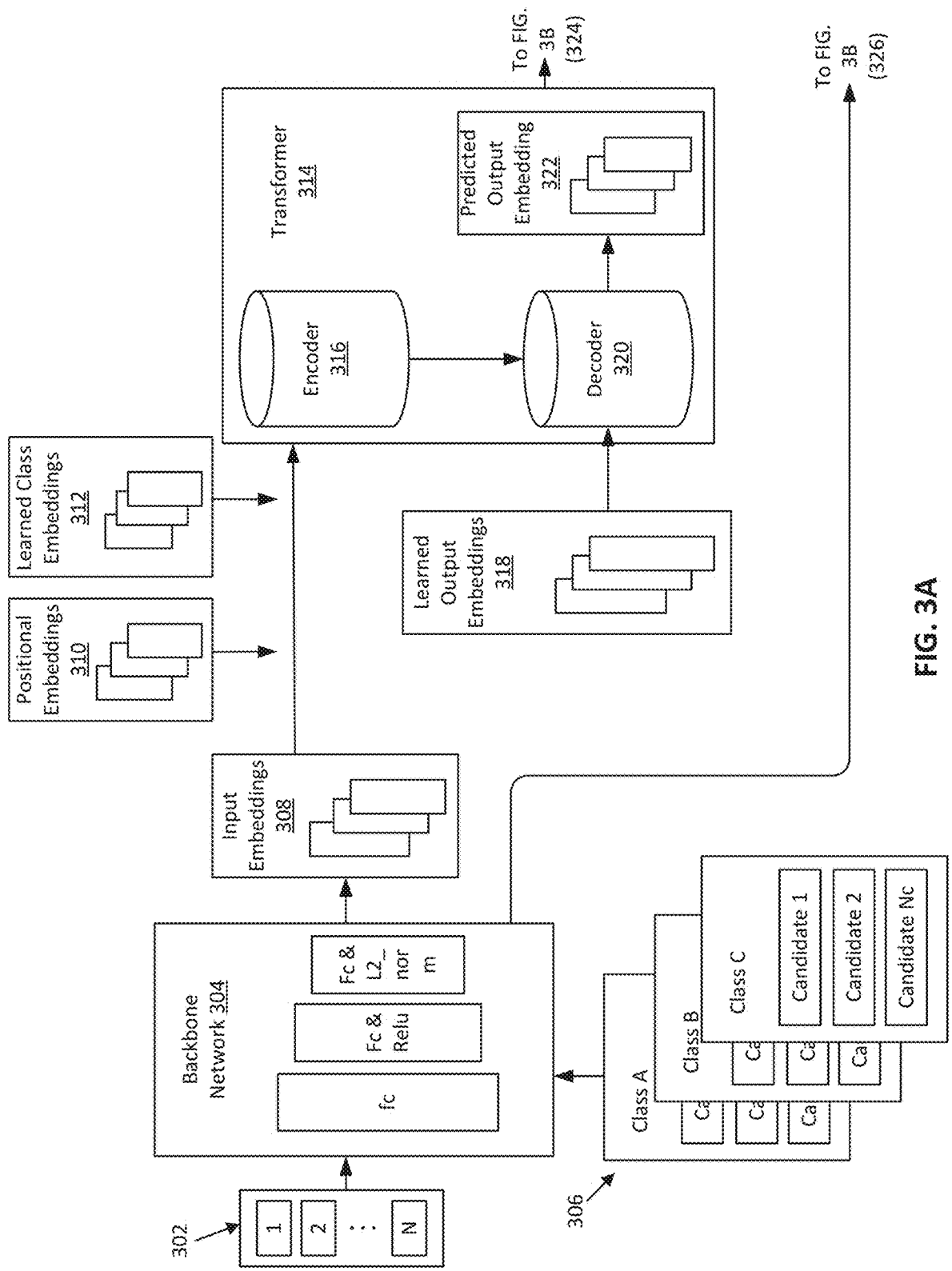
FIGS. 3A-3B are block diagrams illustrating an example architecture for an artificial intelligence interior design system, in accordance with various aspects of the present disclosure.
Figure 3B:
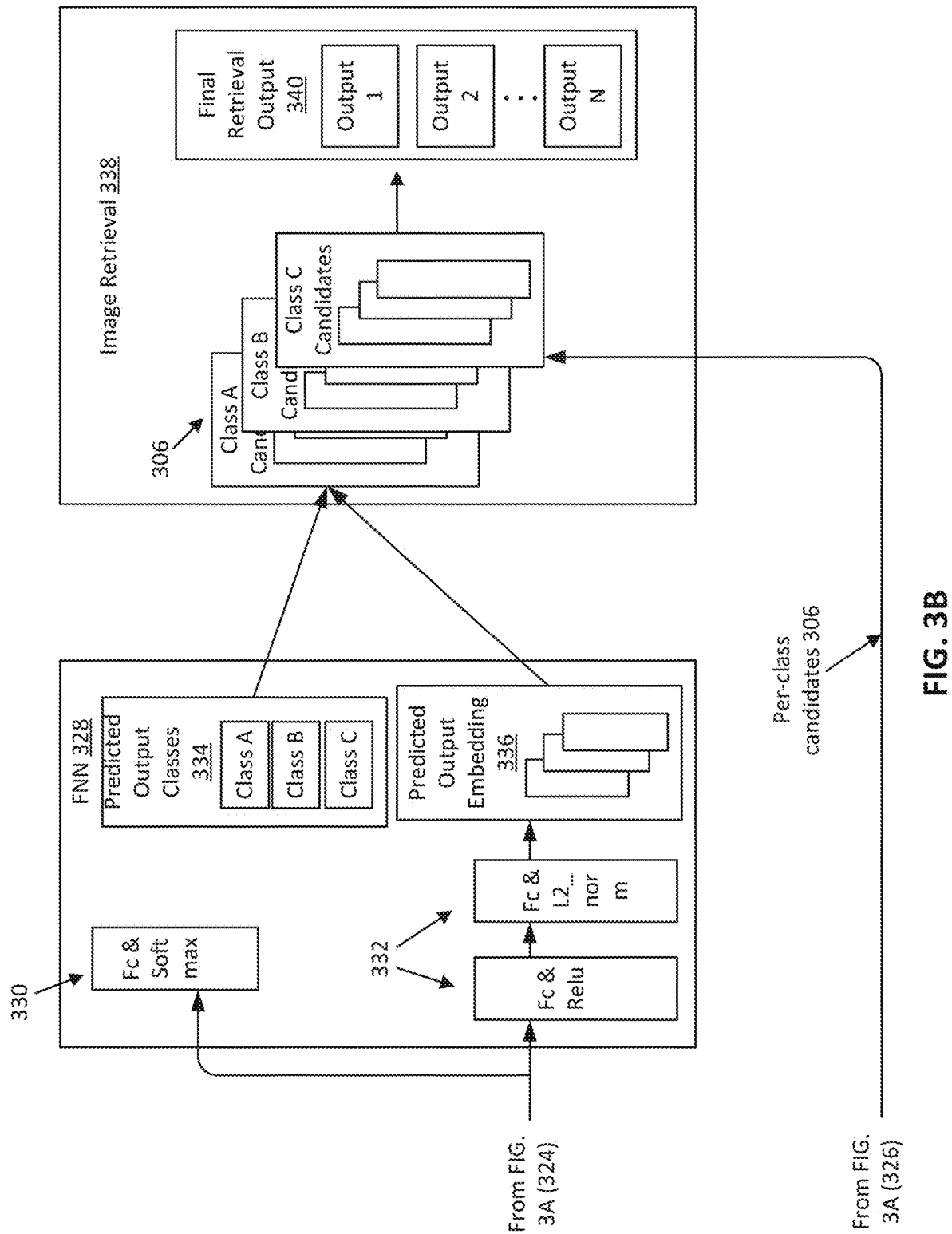

FIGS. 3A-3B are block diagrams illustrating an example architecture for an artificial intelligence interior design system, in accordance with various aspects of the present disclosure. The goal of the architecture depicted in FIGS. 3A-3B is to learn a set of additional objects (e.g., furniture items), given an input frame of image data and the existing items depicted within that image. The framework contains four major components: a backbone network 304 (e.g., a CNN) used to extract image feature embeddings (e.g., input embeddings 308), a transformer 314 including an encoder 316 and a decoder 320 that applies the attention mechanism, a two-head feed forward network 328 (FIG. 3B) to predict the category and feature embeddings of the output tokens, and use of image retrieval 338 to retrieve the final output 340. Each component is described in further detail below.

Backbone Network 304—Starting from the initial scene image (not shown in FIGS. 3A, 3B) with its N objects labeled, the objects may be cropped out to obtain N input images. $N_{in}$ objects may be selected (e.g., randomly or pseudo-randomly) together with the scene image (e.g., scene image 204) from which these images were cropped to form the input image set 302. The input image set 302 may be input into a convolutional network (CNN) (e.g., backbone network 304) which generates a D-dimensional feature embedding for each image in the input set. In various examples, the embeddings may be L2-Normalized. The embeddings are depicted in FIG. 3A as input embeddings 308. Note that in some examples, an image of an empty room or other space may be provided (e.g., a room without furniture). In such cases, the artificial intelligence interior design system generates a set of one or more items that are visually complementary with respect to the appearance of the room itself (e.g., colors, style, wallpaper, fixtures, etc.).

Encoder 316—The encoder 316 of transformer 314 expects a set as input where each token is represented by a D-dimensional embedding. In the current example, a D-dimensional input embedding comprises the summation of the D-dimensional input embeddings 308, a D-dimensional class embedding (e.g., learned class embeddings 312), and a D-dimensional positional embedding 310. Specifically, the input embeddings 308 are generated through the CNN backbone network 304, the learned class embeddings 312 are learned embeddings of size D×(C+1) (C different classes plus the class of 'scene image'), and the D-dimensional positional embeddings 310 represent the relative location of the objects on the original scene image. In various examples described herein, fixed positional encodings may be used, where each dimension (i) of the positional encoding (pos) corresponds to a sinusoid as:

$$PE_{pos,2i} = \sin\frac{pos}{1000^{2i/d}} \text{ and } PE_{pos,2i+1} = \cos\frac{pos}{1000^{2i/d}} \quad (1)$$

In order to obtain the position ($B_{pos}$) of a bounding box, the upper left corner ($x_{min}$, $y_{min}$) and bottom right corner ($x_{max}$, $y_{max}$) may be considered. Specifically, the original scene image of size W×H may be divided into M×M and a determination of which grids the two corners fall into along the x and y axis, respectively, may be made.

$$B_{pos} = \left(\left\lceil\frac{x_{min}}{W} \times M\right\rceil, \left\lceil\frac{y_{min}}{H} \times M\right\rceil, \left\lceil\frac{x_{max}}{W} \times M\right\rceil, \left\lceil\frac{y_{min}}{H} \times M\right\rceil\right) \quad (2)$$

The four elements of $B_{pos}$ may be used in equations (1) above to obtain the positional encodings $PE_{box}=(PE_{xmin}, PE_{ymin}, PE_{xmax}, PE_{ymax})$ for the four coordinates. The final positional embedding 310 of a box may be the summation of the four positional encodings.

Then the combined input embedding (e.g., input embedding 308, positional embedding 310, and learned class embedding 312) of size D×($N_{in}$+1) may be passed through encoder 316. Encoder 316 may include several encoder layers with a multi-headed self-attention module and a feed forward network. The encoder 316 outputs a feature map of D×($N_{in}$+1).

Decoder 320—The decoder 320 receives output embeddings from the encoder 316. Additionally, decoder 320 receives N learned output embeddings 318 of size D as input where N refers to the largest number of predictions the model generates. Together with its input queries, the decoder 320 applies multiple layers of self-attention and encoder-decoder attention to generate the predicted output embeddings 322. Described below are set prediction techniques that may be used in various examples.

Set Prediction—One limitation of the sequence prediction methodology typical of transformer models is that it requires the output tokens to have a determined order.

Unlike NLP problems where the order of individual words in a sentence is non-interchangeable, in a use case of complementary product(s) recommendation, the order of items does not matter. Therefore, a set-to-set prediction instead of a sequence-to-sequence prediction is more suitable for the complementary products recommendation use case. In various examples, the $N_{out}$ output tokens may be predicted in parallel without applying the autoregressive process. Specifically, the decoder may take N learned query embeddings of size d as input, where N refers to the largest number of predictions generated by the model. Without applying the binary positional mask, full self- and encoder-decoder attention are enabled over the decoder query embeddings so that the model can reason about the pairwise relationship among all tokens, as well as the global context.

However, unlike the NLP problems where the order of individual words in a sentence is non-interchangeable, in the use case of recommending visually-complementary items, the order of the items do not matter. Therefore, a set-to-set prediction instead of a sequence-to-sequence prediction may be more suitable. Accordingly, the following steps may be used to convert the sequence prediction into a set prediction. Firstly, the binary mask may be removed to allow full self-attention and encoder-decoder attention over the decoder query embeddings so that the model can reason about all pairwise relationships among all tokens the as well as the global context of the original image. Secondly, a one-to-one matching between the ground truth and the predicted tokens is determined. The matching step is described in further detail below.

Two-headed Feedforward Networks and Final Image Retrieval—As shown in FIG. 3B, FNN 328 includes two feed forward neural network heads (feed forward neural networks 330 and 332). Feed forward neural network 330 may be a classification head trained to predict the class labels (e.g., predicted output classes 334) of each token through a softmax function. Tokens may be received from connection 324. Feed forward neural network 332 may be, for example, a two-layer perceptron with ReLU activation function used to generate the final embeddings (e.g., predicted output embedding 336) through a triplet loss function. The predicted output embeddings 336 may be L2-normalized. Although various components (e.g., FNN 328, backbone network 304) are depicted and/or described having particular architectures and/or using particular loss and/or activation functions, a variety of other implementations are possible and may be used in accordance with the various techniques described herein.

At the image retrieval 338, for each targeted category c, there may be $N_c$ product images (e.g., images of items available for sale on an e-commerce site) forming the candidate pool (e.g., received as per-class candidates 306 at connection 326). Each of the per-class candidate images 306 may be passed through the CNN backbone network 304 to generate their respective feature embeddings. For a predicted output embedding 336 (e.g., a predicted output token), the predicted output class label (from predicted output classes 334) and the predicted output embedding 336 are used to search for the closest product image in the corresponding candidate pool (e.g., among the per-class candidates 306). The resulting product images (e.g., final output 340 comprising Outputs 1, 2, . . . , N) are the final outputs for the input image.

Figure 4:
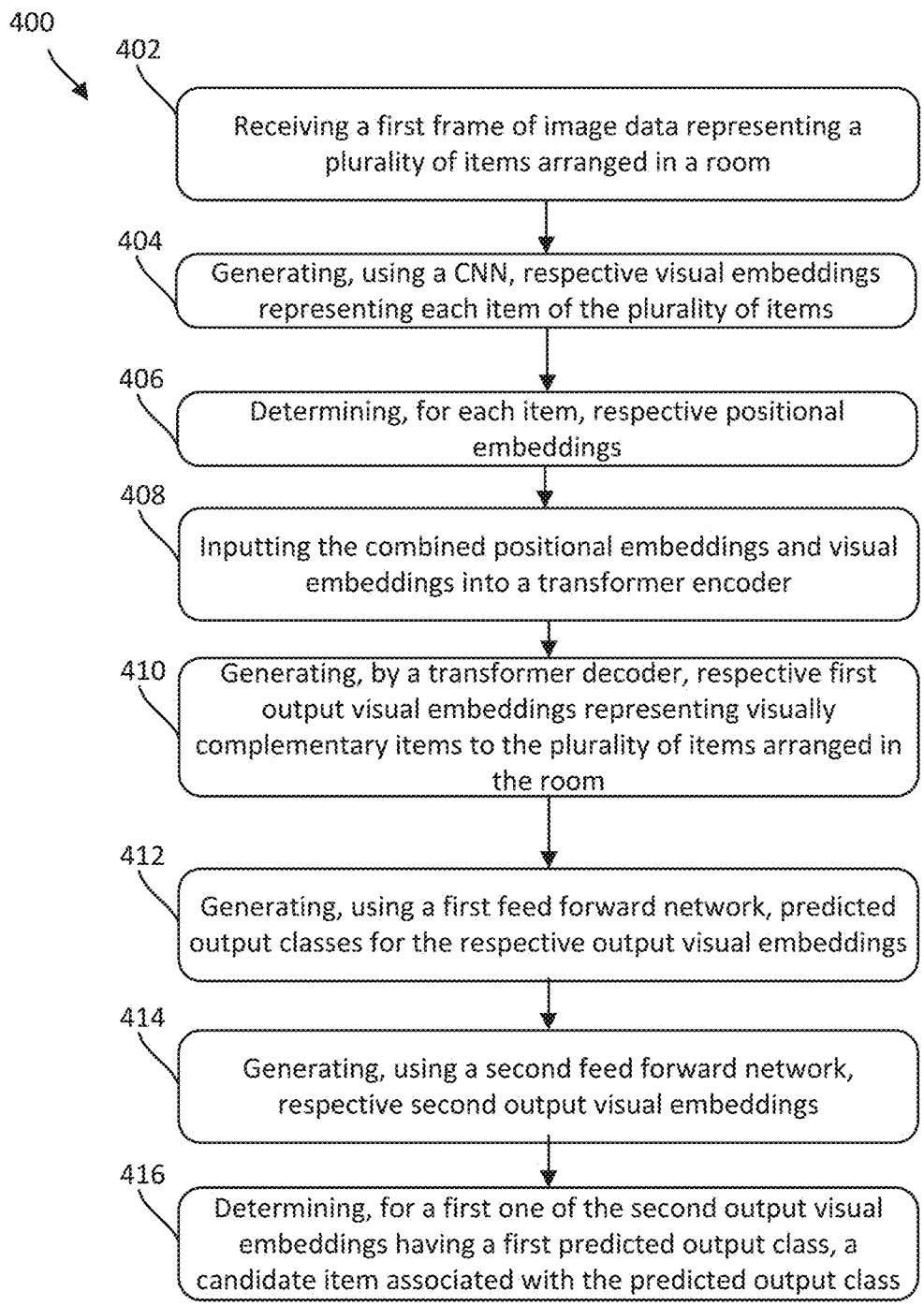
FIG. 4 depicts an example process for recommending candidate items by an artificial intelligence interior design system based on an input image, in accordance with various aspects of the present disclosure.

FIG. 4 depicts an example process for recommending candidate items by an artificial intelligence interior design system based on an input image, in accordance with various aspects of the present disclosure. Those actions in FIG. 4 that have been previously described in reference to FIGS. 1-3 may not be described again herein for purposes of clarity and brevity. The actions of the process depicted in the flow diagram of FIG. 4 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 400 may begin at action 402, at which a first frame of image data may be received representing a plurality of items arranged in a room. For example, an image may be captured using an image sensor of a user's device. For example, the user may take a picture of a room for which the user would like to receive suggested items that are visually complementary to the room and/or to the items currently within the room. In other examples, the user may select an image of a room (or other physical environment) that is displayed on a website and/or an image of a room stored as a file in non-transitory computer-readable memory.

Processing may continue at action 404, at which a CNN or other backbone network may be used to generate respective visual embeddings representing each item of the plurality of items. In various examples, individual item images of each item present in the first frame of image data received at action 402 may be generated (e.g., using the output of an object detector model and/or segmentation model). The individual item images may be sent as inputs to a backbone network trained to generate per-image embeddings for each item. Additionally, an ensemble image (e.g., the first frame of image data received at action 402) may be sent as an input to the backbone network to generate an embedding representing the entire scene.

Processing may continue at action 406, at which respective positional embeddings may be generated for each item. Various techniques may be used to generate the positional embeddings. For example, bounding box coordinates may be used as positional embeddings. However, in some examples, positional embeddings defined at the pixel level may be computationally prohibitive and/or burdensome. Accordingly, various techniques may be used to generate pixel embeddings at a less granular level (such as overlaying a grid over the image and using grid coordinates as positional embeddings as described above).

Processing may continue at action 408, at which the combined positional embeddings and visual embeddings (for each item) may be input into a transformer encoder. In various examples, learned class embeddings for each token may also be combined with the positional embeddings and visual embeddings to provide some class information concerning the input item representations. In various examples, the per-item embeddings (e.g., comprising visual embeddings, positional embeddings, and/or learned class embeddings) may be concatenated or otherwise combined prior to input into the transformer encoder. The transformer encoder may generate representational data for each token using the self-attention mechanisms of the transformer encoder that takes into account the other input tokens as well as information concerning the overall scene.

Processing may continue to action 410, at which a transformer decoder may generate respective output visual embeddings that represent visually complementary items to the plurality of items arranged in the room from the first frame of input image data. Tokens (e.g., per-item representational data) output by the transformer encoder may be provided to the transformer decoder. The transformer decoder may process these tokens using encoded contextual information and the encoder-decoder attention mechanism to generate output embeddings that represent visually complementary items for the scene.

Processing may continue to action 412, at which a first feed forward network (e.g., FNN 330) may predict output classes for the respective output visual embeddings output by the transformer decoder. In various examples, the predicted output classes may be used during image retrieval to search candidate items of particular classes when matching the output visual embeddings to particular items.

Processing may continue to action 414, at which a second feed forward network (e.g., FNN 332) may generate respective second output visual embeddings. In various examples, a second feed forward network may be used to generate the per-token final visual output embeddings that may be used for the image retrieval task.

Processing may continue to action 416, at which a candidate item may be determined for a first one of the second output visual embeddings. The first one of the second output visual embeddings may be associated with a first predicted output class (e.g., predicted by FNN 332 for the relevant token). Accordingly, the candidate item may be selected from among candidate items that are of the predicted output class. In various examples, the candidate item may be selected by finding an item of the predicted output class among the candidate item with the highest cosine similarity and/or with the smallest Euclidean distance in the embedding space.

Figure 5:
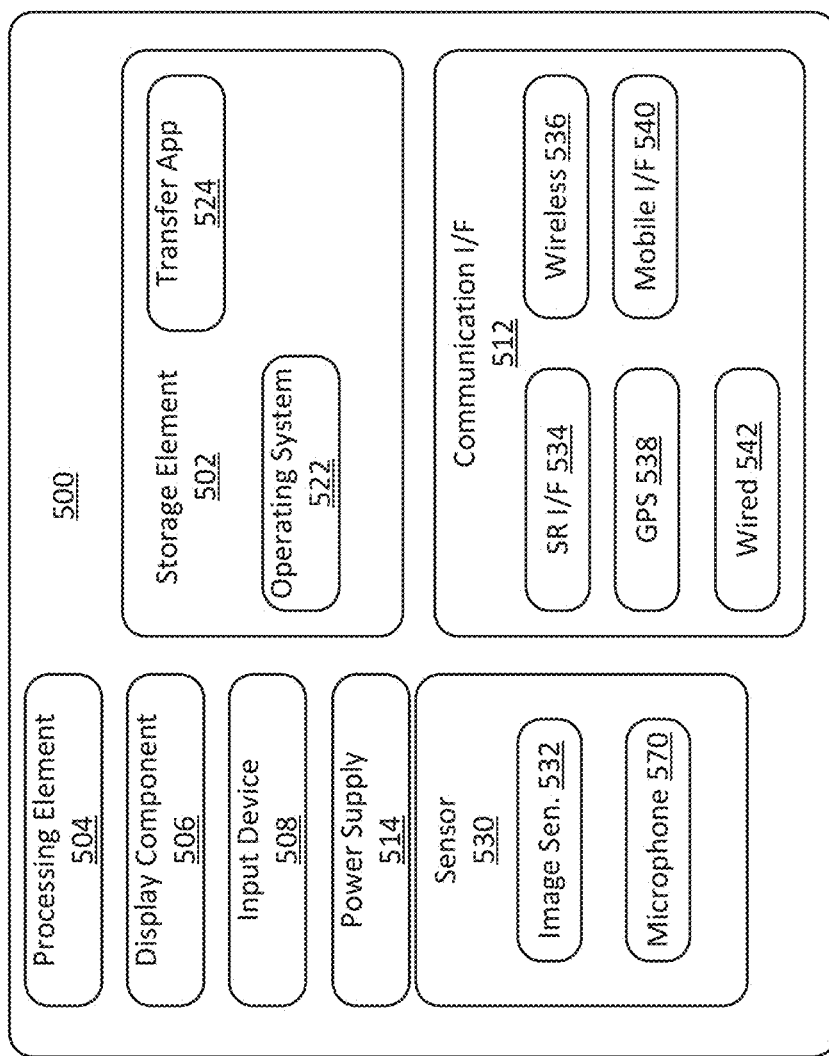
FIG. 5 is a block diagram showing an example architecture of a computing device that may be used in accordance with various aspects of the present disclosure.

FIG. 5 is a block diagram showing an example architecture 500 of a computing device that may be used to instantiate the various machine learning models such as the backbone networks and/or the transformer models described herein, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store parameters, and/or machine learning models generated using the various techniques described herein.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display suggested personalized search queries generated in accordance with the various techniques described herein.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 604, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information. In some further examples, the image sensor 532 may comprise a depth sensor and/or multiple depth sensors. For example, the image sensor 532 may include a TOF sensor, stereoscopic depth sensors, a lidar sensor, radar, etc.

As noted above, multiple devices may be employed in a single system. In such a multi-device system, each of the devices may include different components for performing different aspects of the system's processing. The multiple devices may include overlapping components. The components of the computing devices, as described herein, are exemplary, and may be located as a stand-alone device or may be included, in whole or in part, as a component of a larger device or system.

Figure 6:
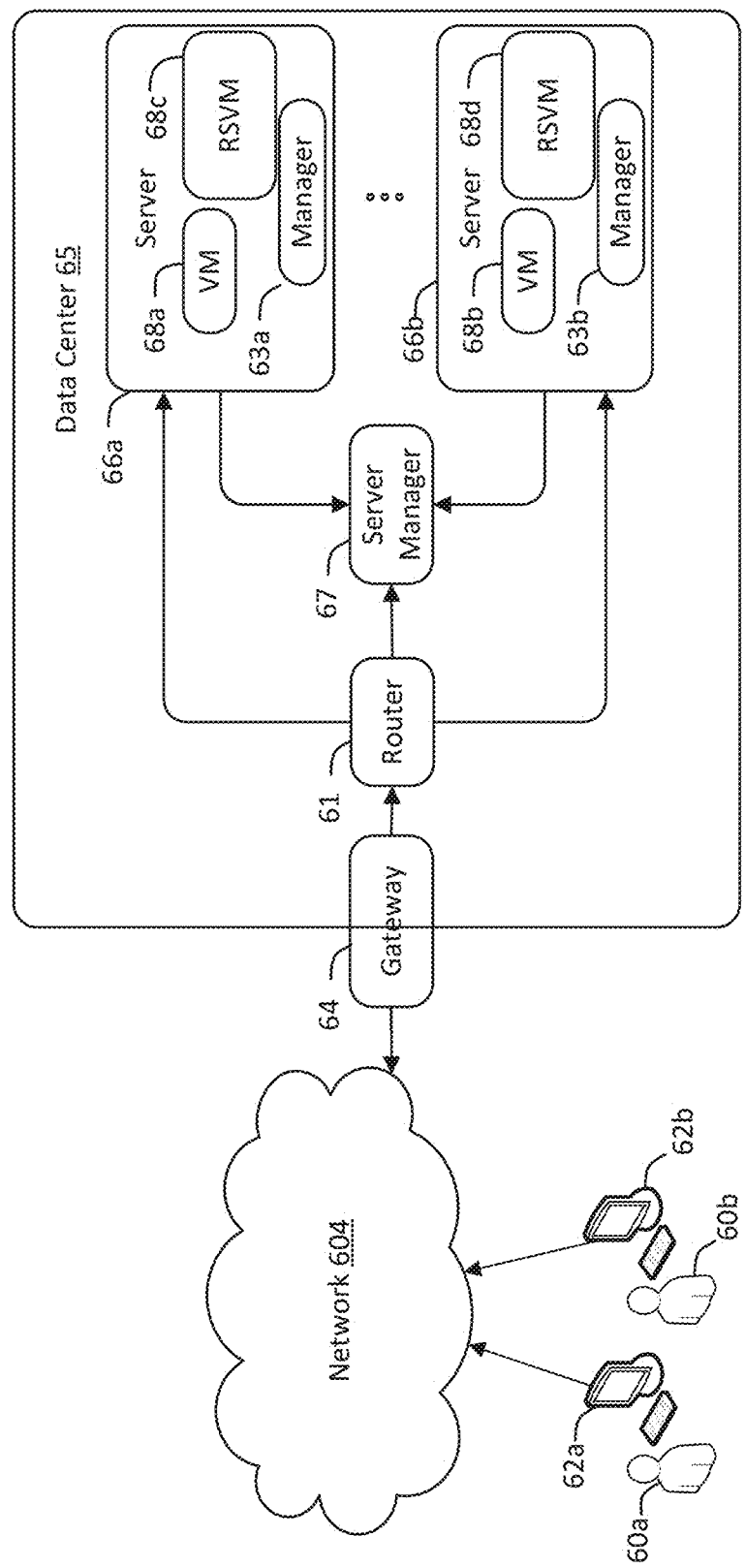
FIG. 6 is a diagram illustrating an example system for sending and providing data that may be used in accordance with the present disclosure.

An example system for sending and providing data will now be described in detail. In particular, FIG. 6 illustrates an example computing environment in which the embodiments described herein may be implemented. For example, the computing environment of FIG. 6 may be used to provide the various machine learning models described herein as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60*a* and 60*b* (which may be referred herein singularly as user 60 or in the plural as users 60) via user computers 62*a* and 62*b* (which may be referred herein singularly as user computer 62 or in the plural as user computers 62) via network 604. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more of the various machine learning techniques described herein.

These services may be configurable with set or custom applications and may be configurable in size, execution, cost, latency, type, duration, accessibility and in any other dimension. These web services may be configured as available infrastructure for one or more clients and can include one or more applications configured as a system or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66*a* and 66*b* (which may be referred herein singularly as server 66 or in the plural as servers 66) that provide computing resources. These resources may be available as bare metal resources or as virtual machine instances 68*a-d* (which may be referred herein singularly as virtual machine instance 68 or in the plural as virtual machine instances 68). In at least some examples, server manager 67 may control operation of and/or maintain servers 66. Virtual machine instances 68*c* and 68*d* are rendition switching virtual machine ("RSVM") instances. The RSVM virtual machine instances 68*c* and 68*d* may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large-scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 604 may, for example, be a publicly accessible network of linked networks and possibly operated by various distinct parties, such as the Internet. In other embodiments, network 604 may be a private network, such as a corporate or university network that is wholly or partially inaccessible to non-privileged users. In still other embodiments, network 604 may include one or more private networks with access to and/or from the Internet.

Network 604 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 604. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example, computer servers, storage devices, network devices, and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution systems (such as application server instances, Java™ virtual machines (JVMs), general-purpose or special-purpose operating systems that support various interpreted or compiled programming languages such as Ruby, Perl, Python, C, C++, and the like, or high-performance computing systems) suitable for the applications, without, for example, requiring the client to access an instance or an execution system directly. A given execution system may utilize one or more resource instances in some implementations; in other implementations, multiple execution systems may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware system, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Figure 7:
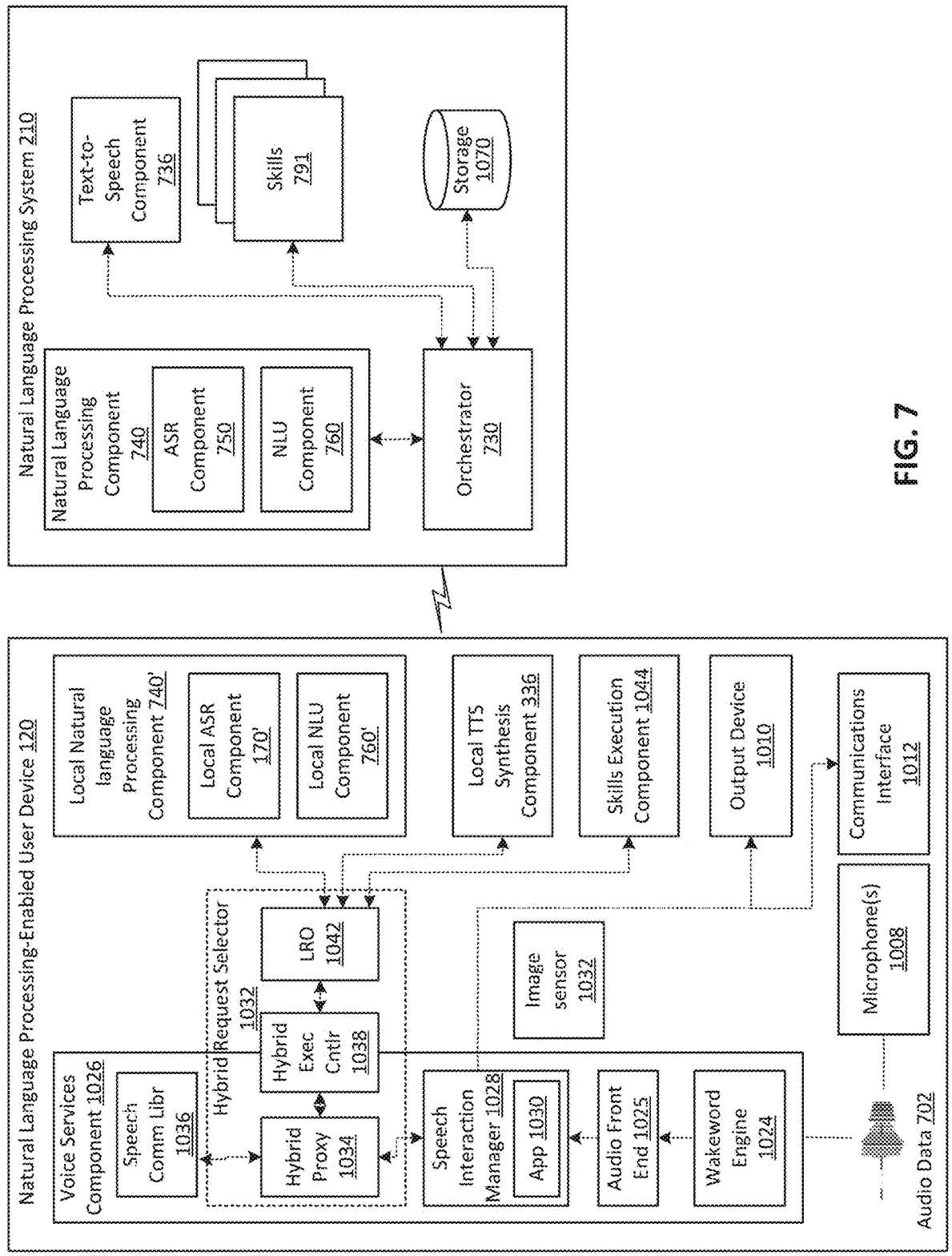
FIG. 7 is a block diagram illustrating a natural language processing-enabled user device and a natural language processing system, in accordance with embodiments of the present disclosure.

FIG. 7 is a block diagram illustrating a natural language processing-enabled user device and a natural language processing system, in accordance with embodiments of the present disclosure. Natural language processing-enabled user device 120 may include microphones 1008 (e.g., far-field microphone arrays) used to transform audio into electrical signals. Natural language processing may then be performed, either locally by the natural language processing-enabled user device 120, by one or more other computing devices communicating with the natural language processing-enabled user device 120 over a network (e.g., natural language processing system 210), or by some combination of the natural language processing-enabled user device 120 and the one or more other computing devices. In various examples, natural language processing-enabled user device 120 may include and/or may be configured in communication with output device(s) 1010 (e.g., speakers and/or displays) effective to output information obtained in response to a user's spoken request or command, or to output content that may be of interest to one or more users. As used herein, a display of natural language processing-enabled user device 120 can refer to device 110 or to any device that a user (e.g., user 101) may use to invoke and/or interact with AI interior design component 102. Further, as used herein, a displayless device refers to a device that does not include a display that is effective to render graphical images or text.

A natural language processing enabled computing system may respond to user utterances by outputting content and/or performing one or more other actions, such as playing music, providing information, calling a taxi, displaying an image, etc. Generally, input data received by the various natural language processing systems and components described herein may comprise natural language input data. Natural language input data may be in the form of audio data representing spoken user utterances (e.g., a spoken user request), text data (e.g., a request typed by a user), gesture data (e.g., data representing a user shaking their head while wearing ear buds, making a hand gesture, etc.), and/or some combination of text data, gesture data, and/or audio data.

Speech-processing systems may be configured with multiple applications (e.g., thousands, tens of thousands, or more applications) that can be used to potentially respond to a user request. Applications may be referred to herein as "skills." Natural language processing systems may be effective to process spoken and/or textual natural language inputs to determine data representing a semantic understanding of the inputs. Skills may include any application effective to communicate with a natural language processing system in order to take one or more actions based on inputs from the natural language processing system. For example, a speech-processing system may include music skills, video skills, calendar skills, timer skills, general knowledge answering skills, game skills, device control skills, etc. As described herein, skills receive natural language understanding (NLU) data comprising slot data and/or intent data and are configured to determine one or more actions based on the slot data and/or intent data. Examples of such actions may include text to be processed into output audio data (e.g., synthetic speech) via a text-to-speech (TTS) component, an executable command effective to play a song from a music service, a movie from a movie service, or the like, an executable command effective to cause a system to perform an action (e.g., turning lights on/off, controlling an appliance, purchasing an item, etc.).

The invocation of a skill by a user's utterance may include a request that an action be taken. The number of applications/skills continues to grow and the rate of growth is increasing as developers become more accustomed to application programming interfaces (APIs) and application development kits provided for the voice user interface system. Rule-based approaches and/or predefined utterance matching may be used in some systems for processing requests spoken in a certain format to invoke a particular application. In at least some examples, a "skill," "skill component," "skill," "natural language processing skill," and the like may be software running on a computing device, similar to a traditional software application running on a computing device. Such skills may include a voice user interface in addition to or instead of, in at least some instances, a graphical user interface, smart home device interface, and/or other type of interface.

In addition to using the microphone(s) 1008 to capture utterances and convert them into digital audio data 702, the natural language processing-enabled user device 120 may additionally, or alternatively, receive audio data 702 (e.g., via the communications interface 1012) from another device in the environment. In various examples, the natural language processing-enabled user device 120 may capture video and/or other image data using an image sensor 1032. Under normal conditions, the natural language processing-enabled user device 120 may operate in conjunction with and/or under the control of a remote, network-based or network-accessible natural language processing system 210. The natural language processing system 210 may, in some instances, be part of a network-accessible computing platform that is maintained and accessible via a wide area network (WAN), such as network 104. Network-accessible computing platforms such as this may be referred to using terms such as "on-demand computing", "software as a service (SaaS)", "platform computing", "network-accessible platform", "cloud services", "data centers", and so forth. The natural language processing system 210 may be configured to provide particular functionality to large numbers of local (e.g., in-home, in-car, etc.) devices of different users. The WAN is representative of any type of public or private, wide area network, such as the Internet, which extends beyond the environment of the natural language processing-enabled user device 120. Thus, the WAN may represent and/or include, without limitation, data and/or voice networks, a wired infrastructure (e.g., coaxial cable, fiber optic cable, etc.), a wireless infrastructure (e.g., radio frequencies (RF), cellular, satellite, etc.), and/or other connection technologies.

In some embodiments, the natural language processing system 210 may be configured to receive audio data 702 from the natural language processing-enabled user device 120, to recognize speech in the received audio data 702, and to perform functions in response to the recognized speech. In some embodiments, these functions involve sending a command, from the natural language processing system 210, to the natural language processing-enabled user device 120 to cause the natural language processing-enabled user device 120 to perform an action, such as output an audible response to the user speech via output device 1010 (e.g., one or more loudspeakers). Thus, under normal conditions, when the natural language processing-enabled user device 120 is able to communicate with the natural language processing system 210 over a WAN (e.g., network 104), some or all of the functions capable of being performed by the natural language processing system 210 may be performed by sending a command over a WAN to the natural language processing-enabled user device 120, which, in turn, may process the command for performing actions. For example, the natural language processing system 210, via a remote command that is included in remote response data, may instruct the natural language processing-enabled user device 120 to output an audible response (e.g., using a local text-to-speech (TTS) synthesis component 736) to a user's question, to output content (e.g., music) via output device 1010 (e.g., one or more loudspeakers) of the natural language processing-enabled user device 120, or to control other devices in the local environment (e.g., the user's home). It is to be appreciated that the natural language processing system 210 may be configured to provide other functions, in addition to those discussed herein, such as, without limitation, providing step-by-step directions for navigating from an origin to a destination location, conducting an electronic commerce transaction on behalf of a user as part of a shopping function, establishing a communication session between the current user and another user, etc.

In order to process voice commands locally, the natural language processing-enabled user device 120 may include a local voice services component 1026. When a user utterance including the wakeword is captured by the microphone 1008 of the natural language processing-enabled user device 120, the audio data 702 representing the utterance is received by a wakeword engine 1024 of the voice services component 1026. The wakeword engine 1024 may be configured to compare the audio data 702 to stored models used to detect a wakeword (e.g., "Computer") that indicates to the natural language processing-enabled user device 120 that the audio data 702 is to be processed for determining an intent. Thus, the wakeword engine 1024 is configured to determine whether a wakeword is detected in the audio data 702, and, if a wakeword is detected, the wakeword engine 1024 can proceed with routing the audio data 702 to an audio front end (AFE) 1025 (sometimes referred to as an acoustic front end (AFE)) of the voice services component 1026. If a wakeword is not detected in the audio data 702, the wakeword engine 1024 can refrain from sending the audio data 702 to the AFE 1025, thereby preventing the audio data 702 from being further processed. The audio data 702 can be discarded.

The AFE 1025 is configured to transform the audio data 702 received from the wakeword engine 1024 into data for processing by a suitable ASR component and/or NLU component. The AFE 1025 may reduce noise in the audio data 702 and divide the digitized audio data 702 into frames representing a time intervals for which the AFE 1025 determines a number of values, called features, representing the qualities of the audio data 702, along with a set of those values, called a feature vector, representing the features/qualities of the audio data 702 within the frame. Many different features may be determined, and each feature represents some quality of the audio data 702 that may be useful for ASR processing and/or NLU processing. A number of approaches may be used by the AFE 1025 to process the audio data 702, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. In some embodiments, the AFE 1025 is configured to use beamforming data to process the received audio data 702. Beamforming can be used to distinguish between the directions from which speech and noise originate. Accordingly, the microphones 1008 may be arranged in a beamforming array to receive multiple audio signals, where multiple audio sources including speech may be identified in different beams and processed. Beamforming may involve processing multiple audio signals (e.g., originating from multiple microphones in a microphone array) together, such as by time shifting one audio signal with respect to another audio signal, to increase the signal and decrease the noise in the audio. Time offsets in the audio data 702, used by the AFE 1025 in beamforming, may be determined based on results of the wakeword engine 1024's processing of the audio data 702. For example, the wakeword engine 1024 may detect the wakeword in the audio data 702 from a first microphone 1008 at time, t, while detecting the wakeword in the audio data 702 from a second microphone 1008 a millisecond later in time (e.g., time, t+1 millisecond), and so on and so forth, for any suitable number of audio signals corresponding to multiple microphones 1008 in a microphone array.

A speech interaction manager (SIM) 1028 of the voice services component 1026 may receive the audio data 702 that has been processed by the AFE 1025. The SIM 1028 may manage received audio data 702 by processing request data and non-speech noise or sounds as events, and the SIM 1028 may also manage the processing of commands that are used to respond to the user speech or non-speech noise or sounds (e.g., by controlling the action(s) of the natural language processing-enabled user device 120). The SIM 1028 may include one or more client applications 1030 for performing various functions at the natural language processing-enabled user device 120.

A hybrid request selector component 1032 of the natural language processing-enabled user device 120 is shown as including a hybrid proxy component (HP) 1034, among other components. The HP 1034 can be implemented as a layer within the voice services component 1026 that is located between the SIM 1028 and a speech communication library (SCL) 1036, and may be configured to proxy traffic to/from the natural language processing system 210. For example, the HP 1034 may be configured to pass messages between the SIM 1028 and the SCL 1036 (such as by passing events and instructions there between), and to send messages to/from a hybrid execution controller component (HEC) 1038 of the hybrid request selector component 1032. For instance, command data received from the natural language processing system 210 can be sent to the HEC 1038 using the HP 1034, which sits in the path between the SCL 1036 and the SIM 1028. The HP 1034 may also be configured to allow audio data 702 received from the SIM 1028 to pass through to the natural language processing system 210 (via the SCL 1036) while also receiving (e.g., intercepting) this audio data 702 and sending the received audio data 702 to the HEC 1038 (sometimes via an additional SCL).

As will be described in more detail below, the HP 1034 and the HEC 1038 are configured to perform a handshake procedure to connect to each other. As part of this handshake procedure, the HP 1034 and the HEC 1038 exchange data including, without limitation, configurations, context, settings, device identifiers (ID), networking protocol versions, time zones, and language data (sometimes referred to herein as "locale data"). Based on at least some of this data (e.g., based at least in part on the language data) exchanged during the handshake procedure, the HEC 1038 determines whether to accept or reject the connection request from the HP 1034. If the HEC 1038 rejects the HP's 1034 connection request, the HEC 1038 can provide metadata to the HP 1034 that provides a reason why the connection request was rejected.

A local natural language processing component 740' (sometimes referred to as a "natural language processing component," a "spoken language understanding (SLU) component," a "speech engine," or an "engine") is configured to process audio data 702 (e.g., audio data 702 representing user speech, audio data 702 representing non-speech noise or sounds, etc.). In some embodiments, the hybrid request selector component 1032 may further include a local request orchestrator component (LRO) 1042. The LRO 1042 is configured to notify the local natural language processing component 740' about the availability of new audio data 702 that represents user speech, and to otherwise initiate the operations of the local natural language processing component 740' when new audio data 702 becomes available. In general, the hybrid request selector component 1032 may control the execution of the local natural language processing component 740', such as by sending "execute" and "terminate" events/instructions to the local natural language processing component 740'. An "execute" event may instruct the local natural language processing component 740' to continue any suspended execution based on audio data 702 (e.g., by instructing the local natural language processing component 740' to execute on a previously-determined intent in order to generate a command). Meanwhile, a "terminate" event may instruct the local natural language processing component 740' to terminate further execution based on the audio data 702, such as when the natural language processing-enabled user device 120 receives command data from the natural language processing system 210 and chooses to use that remotely-generated command data.

The LRO 1042 may interact with a skills execution component 1044 that is configured to receive intent data output from the local natural language processing component 740' and to execute a skill based on the intent.

To illustrate how the natural language processing-enabled user device 120 can operate at runtime, consider an example where a user utters an expression, such as "Computer, turn off the kitchen lights." The audio data 702 is received by the wakeword engine 1024, which detects the wakeword "Computer," and forwards the audio data 702 to the SIM 1028 via the AFE 1025 as a result of detecting the wakeword. The SIM 1028 may send the audio data 702 to the HP 1034, and the HP 1034 may allow the audio data 702 to pass through to the natural language processing system 210 (e.g., via the SCL 1036), and the HP 1034 may also input the audio data 702 to the local natural language processing component 740' by routing the audio data 702 through the HEC 1038 of the hybrid request selector 1032, whereby the LRO 1042 notifies the local natural language processing component 740' of the incoming audio data 702. At this point, the hybrid request selector 1032 may wait for response data from the natural language processing system 210 and/or the local natural language processing component 740'.

The local natural language processing component 740' is configured to receive the audio data 702 from the hybrid request selector 1032 as input, to recognize speech (and/or non-speech audio events) in the audio data 702, to determine an intent (e.g., user intent) from the recognized speech (or non-speech audio event). This intent can be provided to the skills execution component 1044 via the LRO 1042, and the skills execution component 1044 can determine how to act on the intent by generating directive data. In some cases, a directive may include a description of the intent (e.g., an intent to turn off {device A}). In some cases, a directive may include (e.g., encode) an identifier of a second device, such as the kitchen lights, and an operation to be performed at the second device. Directive data that is generated by the skills execution component 1044 (and/or the natural language processing system 210) may be formatted using Java, such as JavaScript syntax, or JavaScript-based syntax. This may include formatting the directive using JSON. In some embodiments, a locally-generated directive may be serialized, much like how remotely-generated directives are serialized for transmission in data packets over network 104. In other embodiments, a locally-generated directive is formatted as a programmatic API call with a same logical operation as a remotely-generated directive. In other words, a locally-generated directive may mimic remotely-generated directives by using a same, or a similar, format as the remotely-generated directive.

The local natural language processing component 740' may include an automatic speech recognition (ASR) component 750' that is configured to perform ASR processing on the audio data 702 to convert the audio data 702 into text data (sometimes referred to herein as "ASR text data," an "ASR result", or "ASR data"). ASR transcribes audio data 702 into text data representing the words of the user speech contained in the audio data 702. A spoken utterance in the audio data 702 can be input to the local ASR component 750', which then interprets the utterance based on the similarity between the utterance and pre-established language models available to the local natural language processing component 740'. In some embodiments, the local ASR component 750' outputs the most likely text recognized in the audio data 702, or multiple hypotheses in the form of a lattice or an N-best list with individual hypotheses corresponding to confidence scores or other scores (such as probability scores, etc.). In some embodiments, the local ASR component 750' is customized to the user (or multiple users) who created a user account to which the natural language processing-enabled user device 120 is registered. For instance, the language models (and other data) used by the local ASR component 750' may be based on known information (e.g., preferences) of the user, and/or on a history of previous interactions with the user.

The local natural language processing component 740' may also include a local NLU component 760' that performs NLU processing on the generated ASR text data to determine intent data and/or slot data (referred to herein as a "NLU result", or "NLU data") so that directives may be determined (e.g., by the skills execution component 1044) based on the intent data and/or the slot data. Generally, the local NLU component 760' takes textual input (such as text data generated by the local ASR component 750') and attempts to make a semantic interpretation of the ASR text data.

Natural Language Processing System

In other situations, the natural language processing-enabled user device 120 may send the audio data 702 to the natural language processing system 210 for processing. As described above, the natural language processing-enabled user device 120 may capture audio using the microphone 1008, and send audio data 702 (e.g., representing a spoken user request), corresponding to the captured audio, to the natural language processing system 210. The natural language processing-enabled user device 120 may include a wakeword detection component that detects when input audio includes a spoken wakeword, and when the wakeword is detected, the audio data 702 is sent by the natural language processing-enabled user device 120 to the natural language processing system 210.

Upon receipt by the natural language processing system 210, the audio data 702 may be sent to an orchestrator 730. The orchestrator 730 may include memory and logic that enables the orchestrator 730 to send various pieces and forms of data to various components of the system.

Similar to the operation described above with respect to the local natural language processing component 740' of the natural language processing-enabled user device 120, the orchestrator 730 may send the audio data 702 to a natural language processing component 740. An ASR component 750 of the natural language processing component 740 transcribes the audio data 702 into one or more hypotheses representing speech contained in the audio data 702. The natural language processing component 740 interprets the speech in the audio data based on a similarity between the characteristics of the audio data corresponding to the speech and pre-established language models. For example, the natural language processing component 740 may compare the audio data 702 with models for sounds (e.g., subword units such as phonemes) and sequences of sounds to identify words that match the sequence of sounds in the speech represented in the audio data 702. The natural language processing component 740 may send text data generated thereby to an NLU component 760 of the natural language processing component 740. The text data output by the natural language processing component 740 may include a top scoring hypothesis of the speech represented in the audio data 702 or may include an N-best list including a group of hypotheses of the speech represented in the audio data 702, and potentially respective scores ASR processing confidence scores.

The NLU component 760 attempts to make a semantic interpretation of the phrases or statements represented in the text data input therein. That is, the NLU component 760 determines one or more meanings associated with the phrases or statements represented in the text data based on individual words represented in the text data. The NLU component 760 interprets a text string to derive an intent of the user (e.g., an action that the user desires be performed) as well as pertinent pieces of information in the text data that allow a device (e.g., the natural language processing system 210) to complete the intent. For example, if the text data corresponds to "Play the new album by [Musical_Artist]", the NLU component 760 may determine the user intended to invoke a music playback intent to play the identified album.

The natural language processing system 210 may include a non-transitory computer-readable memory 1070, storing various instructions for operation of the natural language processing system 210.

As described above, the natural language processing system 210 may include one or more skills 791. The natural language processing system 210 may also include a TTS component 736 that synthesizes speech (e.g., generates audio data) corresponding to text data input therein. The TTS component 736 may perform speech synthesis using one or more different methods. In one method of synthesis called unit selection, the TTS component 736 matches text data against one or more databases of recorded speech. Matching units are selected and concatenated together to form audio data. In another method of synthesis called parametric synthesis, the TTS component 736 varies parameters such as frequency, volume, and noise to create an artificial speech waveform output. Parametric synthesis uses a computerized voice generator, sometimes called a vocoder.

The various components of the natural language processing system 210 and the natural language processing-enabled user device 120 described herein may be implemented in software, hardware, firmware, or some combination thereof.

The natural language processing system 210 may reside on natural language processing-enabled user device 120, in a cloud computing environment, or some combination thereof. For example, the natural language processing-enabled user device 120 may include computing equipment, some portion of which is configured with some or all of the components or functionality of natural language processing system 210 and another portion of which is configured with some or all of the components or functionality of computing device(s) used in natural language processing system 210. The natural language processing-enabled user device 120 may then perform a variety of functions on its own (such as when remote communications are unavailable), and/or may communicate (when capable) with computing device(s) and/or the natural language processing system 210 to perform other functions. Alternatively, all of the functionality may reside on the natural language processing-enabled user device 120 or remotely.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method of generating content recommendations based on an ensemble image of a room, comprising:
    identifying a first frame of image data representing a plurality of items arranged in the room;
    generating, using a convolutional neural network (CNN), respective visual embeddings representing each item of the plurality of items;
    determining, for each item of the plurality of items, respective positional embeddings representing respective positions of each item of the plurality of items in the first frame of image data;
    inputting the respective visual embeddings and the respective positional embeddings into a transformer model;
    generating, by a decoder of the transformer model, respective first output visual embeddings representing items that are visually complementary to the plurality of items arranged in the room;
    generating, using a first feed forward neural network head, predicted output classes for the respective first output visual embeddings;
    generating, by inputting the respective first output visual embeddings into a second feed forward neural network head, respective second output visual embeddings;
    determining, for a first instance of the second output visual embeddings and a first predicted output class associated with the first instance, a candidate item associated with the first predicted output class; and
    causing the candidate item to be displayed on a display as a recommended item for the plurality of items arranged in the room.

2. The computer-implemented method of claim 1, further comprising:

determining N candidate items associated with the first predicted output class;

generating, using the CNN, a plurality of embeddings, each embedding corresponding to a respective one of the N candidate items;

determining a first embedding among the plurality of embeddings that is associated with a highest cosine similarity with respect to the first instance of the second output visual embeddings; and determining that the candidate item is associated with the first embedding.

3. The computer-implemented method of claim 1, further comprising:

determining a plurality of learned class embeddings; and concatenating the plurality of learned class embeddings, the respective visual embeddings, and the respective positional embeddings into a combined input, wherein the inputting the respective visual embeddings and the respective positional embeddings comprises inputting the combined input into an encoder of the transformer model.

4. A method comprising:

identifying, by at least one computing device, a two-dimensional (2D) image of an environment;

determining a visual representation of one or more items represented in the 2D image;

determining, by the at least one computing device, a positional representation of a first item of the one or more items represented in the 2D image;

inputting the visual representation and the positional representation into a machine learning model;

generating, by the machine learning model, an output embedding based at least in part on the visual representation and the positional representation;

determining a category for the output embedding;

determining a plurality of candidate items for the category;

determining a first output item by comparing the output embedding with respective embeddings of each candidate item of the plurality of candidate items for the category using Euclidean distance or cosine similarity; and causing an image of at least one output item to be displayed in association with the image comprising the one or more items arranged together in the environment, wherein the at least one output item comprises the first output item.

5. The method of claim 4, wherein the machine learning model is a transformer machine learning model.

6. The method of claim 4, wherein the 2D image is uploaded by a user, the method further comprising receiving a request to recommend items for the environment that are visually complementary to the one or more items arranged together in the environment.

7. The method of claim 4, further comprising:

training a machine learning model to generate the output embedding using a first training data set, wherein each instance of the first training data set comprises:

a training image comprising multiple items arranged together in an environment, wherein a first set of items of the multiple items are selected as inputs to the machine learning model, and wherein a second set of items of the multiple items are a target set of items to be predicted by the machine learning model.

8. The method of claim 4, further comprising:

receiving, on a graphical user interface, a first selection of a first item of interest;

causing multiple images of the first item of interest to be displayed based at least in part on the first selection; and receiving a selection of a first image of the multiple images, wherein the first image is the 2D image comprising the one or more items arranged together, wherein the first item is among the one or more items.

9. The method of claim 4, further comprising:

determining learned class embeddings representing different classes of items; and generating the output embedding further based at least in part on the learned class embeddings.

10. The method of claim 4, further comprising:

determining respective images defined by bounding boxes for each item of the one or more items; and determining respective visual representations of each item of the one or more items by inputting the respective images into a convolutional neural network.

11. The method of claim 10, further comprising determining the positional representation for the first item based at least in part on a bounding box associated with the first item.

12. A system comprising:

at least one processor; and non-transitory computer-readable memory storing instructions that, when executed by the at least one processor, are effective to:

receive a two-dimensional (2D) image of one or more items arranged together in an environment;

determine a visual representation of a first item represented in the 2D image;

determine a positional representation of the first item represented in the 2D image;

input the visual representation and the positional representation into a machine learning model;

generate, by the machine learning model, an output embedding based at least in part on the visual representation and the positional representation;

determine a category for the output embedding;

determine a plurality of candidate items for the category;

determine a first output item by comparing the output embedding with respective embeddings of each candidate item of the plurality of candidate items for the category using Euclidean distance or cosine similarity; and cause an image of at least one output item to be displayed in association with the image comprising the one or more items arranged together in the environment, wherein the at least one output item comprises the first output item.

13. The system of claim 12, wherein the machine learning model is a transformer machine learning model.

14. The system of claim 12, wherein the 2D image is uploaded by a user and wherein the non-transitory computer-readable memory stores further instructions that, when executed by the at least one processor, are further effective to receive a request to recommend items for the environment that are visually complementary to the one or more items arranged together in the environment.

15. The system of claim 12, the non-transitory computer-readable memory storing further instructions that, when executed by the at least one processor, are further effective to:

train a machine learning model to generate the output embedding using a first training data set, wherein each instance of the first training data set comprises:

a training image comprising multiple items arranged together in an environment, wherein a first set of items of the multiple items are selected as inputs to the machine learning model, and wherein a second set of items of the multiple items are a target set of items to be predicted by the machine learning model.

16. The system of claim 12, the non-transitory computer-readable memory storing further instructions that, when executed by the at least one processor, are further effective to:

receive, on a graphical user interface, a first selection of a first item of interest;

cause multiple images of the first item of interest to be displayed based at least in part on the first selection; and receive a selection of a first image of the multiple images, wherein the first image is the 2D image comprising the one or more items arranged together in the environment, wherein the first item is among the one or more items.

* * * * *